(12) United States Patent
Pfeiffer

(10) Patent No.: US 7,681,445 B2
(45) Date of Patent: Mar. 23, 2010

(54) APPARATUS FOR DETERMINING AND/OR MONITORING AT LEAST ONE PROCESS VARIABLE

(75) Inventor: Helmut Pfeiffer, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 66 days.

(21) Appl. No.: 11/658,147

(22) PCT Filed: Jul. 5, 2005

(86) PCT No.: PCT/EP2005/053199

§ 371 (c)(1),
(2), (4) Date: Feb. 13, 2008

(87) PCT Pub. No.: WO2006/010696

PCT Pub. Date: Feb. 2, 2006

(65) Prior Publication Data

US 2008/0257035 A1    Oct. 23, 2008

(30) Foreign Application Priority Data

Jul. 23, 2004   (DE) .................. 10 2004 036 018

(51) Int. Cl.
*G01F 23/28* (2006.01)
(52) U.S. Cl. .................................................. 73/290 V
(58) Field of Classification Search ............... 73/290 V, 73/290 R
See application file for complete search history.

(56) References Cited

U.S. PATENT DOCUMENTS

| | | | | |
|---|---|---|---|---|
| 4,325,416 A | * | 4/1982 | Hermann | 141/95 |
| 4,594,584 A | * | 6/1986 | Pfeiffer et al. | 340/620 |
| 5,408,168 A | * | 4/1995 | Pfandler | 318/642 |
| 6,205,855 B1 | * | 3/2001 | Pfeiffer | 73/290 V |
| 6,338,272 B1 | * | 1/2002 | Heuft et al. | 73/290 V |
| 6,845,663 B2 | * | 1/2005 | Lopatin et al. | 73/290 V |
| 6,997,052 B2 | * | 2/2006 | Woehrle | 73/290 V |

FOREIGN PATENT DOCUMENTS

| | | |
|---|---|---|
| AT | 394 112 B | 2/1992 |
| DE | 3348119 C2 | 5/1985 |
| DE | 102 43 430 A1 | 1/2004 |
| EP | 0 950 879 A1 | 10/1999 |

* cited by examiner

*Primary Examiner*—Hezron Williams
*Assistant Examiner*—Rodney T Frank
(74) *Attorney, Agent, or Firm*—Bacon & Thomas, PLLC

(57) ABSTRACT

An apparatus for determining and/or monitoring at least one process variable of a medium and includes: A mechanically oscillatable unit, which executes mechanical oscillations in a direction and which is secured at a seating. Included is an exciting/receiving unit, which excites the mechanically oscillatable unit to mechanical oscillations and which receives the mechanical oscillations of the mechanically oscillatable unit; and a control/evaluation unit, which controls the mechanical oscillations of the mechanically oscillatable unit and which determines and/or monitors the process variable. At least one compensating mass is provided, which is mechanically coupled with the mechanically oscillatable unit and which is embodied and/or secured in such a manner that it executes mechanical oscillations in a direction, wherein the direction of the oscillations of the compensating mass are essentially perpendicular to the direction of the oscillations of the mechanically oscillatable unit.

11 Claims, 5 Drawing Sheets

APPARATUS FOR DETERMINING AND/OR MONITORING AT LEAST ONE PROCESS VARIABLE

FIELD OF THE INVENTION

The invention relates to an apparatus for determining and/or monitoring at least one process variable of a medium.

BACKGROUND OF THE INVENTION

Such apparatus includes typically a mechanically oscillatable unit which executes mechanical oscillations in at least one direction and which is secured at a seating; an exciting/receiving unit which excites the mechanically oscillatable unit to execute mechanical oscillations and which receives the mechanical oscillations of the mechanically oscillatable unit; and a control/evaluation unit which controls the mechanical oscillations of the mechanically oscillatable unit and which, with the mechanical oscillations of the mechanically oscillatable unit, determines, i.e. ascertains, and/or monitors the process variable. The process variable can be, for example, a fill level, or, in the case of liquids as the medium, also, e.g. density or viscosity. Other process variables are, however, likewise possible.

Such an apparatus is disclosed, for example, in patent DE 39 31 453 C1. The principle of measurement of the fill level with such measuring devices is that the oscillations of a mechanically oscillatable unit, e.g. an oscillatory fork, depend on whether the unit is covered by the medium or not. The covering decreases e.g. the amplitude. Conversely, when the amplitude increases, it can be concluded that the medium has fallen below the fill level, as determined by the dimensions of the sensor and the location of the installation. Simultaneously, in the case of covering, however, the density and viscosity of the medium can also be determined. For this it is, e.g., necessary to evaluate, besides amplitude and frequency, also the phase between the exciting signal and the received (response-)signal.

The mechanically oscillatable units are usually so constructed that, as much as possible, no reaction forces and moments arise in the region of the seating (usually involving a membrane, or diaphragm) of the mechanically oscillatable unit on the measuring device. This can usually be accomplished in the case of the above-mentioned oscillatory fork by providing both oscillatory rods with equal mass moments of inertia and stiffnesses, especially thus both tines should be secured equally and as much as possible symmetrically on the membrane. If both tines oscillate with opposite sense with reference to one another, then the forces and moments exactly cancel and no reaction forces and moments act on the seating, respectively on the membrane. In this way, preventing oscillatory energy lost through the seating is prevented. Problematic, however, is the case in which the oscillatory rods are not arranged perpendicularly on the seating, but instead are slightly inclined away from, or toward, one another. The oscillatory fork is thus, quasi, spread apart or pressed together. In this case, axial forces arise parallel to the axis of symmetry of the tines. Since these forces are directed in the same direction, they do not cancel, but instead act on the seating and are consequently coupled to the environment, a fact which can lead to a loss of energy.

SUMMARY OF THE INVENTION

Consequently, an object of the invention is to provide a measuring apparatus on whose seating as little reaction forces as possible are exerted by the mechanically oscillatable unit.

The invention achieves the noted object by the provision of at least one compensating mass which is mechanically coupled with the mechanically oscillatable unit and which is embodied and/or secured in such a manner that it executes, at least mechanical oscillations in one direction, with the direction of the oscillations of the compensating mass being essentially perpendicular to the direction of the oscillations of the mechanically oscillatable unit. An idea of the invention is, thus, that the reaction forces acting in the direction perpendicular to the direction of oscillation of the mechanically oscillatable unit are canceled by a compensating mass oscillating in this direction. Relative to the mechanically oscillatable unit, the opposite phase oscillations of the compensating mass, thus, exactly cancel the effective reaction forces. The forces are thus canceled by the invention, so that the energy in the classical consideration is kept in the system. This is clearly to be distinguished from the case in which the forces are converted by dissipation, e.g. into heat, whereby energy is lost from the system. Thus, if, in the case of the oscillatory fork two oscillatory rods oscillate with opposite phase, so that no radial reaction forces and moments arise, then this canceling is provided in the invention by having the mechanically oscillatable unit and the compensation mass form an oscillatory pair, whose oscillations of opposite phase lead to the fact that no axial reaction forces arise.

An embodiment provides that the mechanically oscillatable unit is embodied and/or secured in such a manner that it executes mechanical oscillations essentially perpendicularly to one of its longitudinal axes and that the compensating mass is embodied and/or secured in such a manner that it executes at least axial oscillations parallel to the longitudinal axis of the mechanically oscillatable unit. In such case, the special instance is, thus, involved, wherein the mechanically oscillatable unit executes transverse, or bending, oscillations. If, in this case, the oscillatory rods or fork tines are inclined relative to their longitudinal, or symmetry, axis, then additional axial force components act on the membrane, which are canceled by corresponding oscillations of opposite phase executed by the compensating mass.

An embodiment provides that the compensating mass is embodied and/or secured in such a manner that reaction forces acting from the mechanically oscillatable unit on the seating are canceled. The compensating mass and stiffness of the suspension must, thus, be tuned to the embodiment of the apparatus, such that an optimum compensation is possible.

An embodiment provides that the mechanically oscillatable unit is secured on at least one membrane. In the case of the seating, a membrane is thus involved in this instance. Usually, the exciting of the mechanically oscillatable unit to oscillations, respectively the reception of these oscillations, is implemented via such a membrane. The membrane itself is, in turn, a part of a housing, with which the measuring device is, for example, suitably secured to a container wall or the like.

An embodiment provides that the exciting/receiving unit is secured to the membrane. Preferably, the exciting/receiving unit is attached to the oppositely lying side of the membrane, so that an optimum oscillation transmission between the mechanically oscillatable unit and the exciting/receiving unit is achieved.

An embodiment provides that at least one housing is provided, that the mechanically oscillatable unit is connected with the housing and that the compensating mass is connected with the housing. The term "connect" means in this case also the mechanical coupling. Usually, the measuring device uses a cup-shaped housing, which is bounded in the process direction by the membrane. The mechanically oscillatable unit and the exciting/receiving unit are then located on the membrane.

This housing enables implementation of transmission of the axial oscillatory energy for the compensating mass. For this purpose, the spring elements of the following embodiment are important.

An embodiment includes that the compensating mass is mechanically coupled with the mechanically oscillatable unit via at least one spring element. Such a spring element enables that the energy/force transmission is implemented, with the embodiment of the compensating mass being so executed that the special requirements of the measuring apparatus can be taken into consideration. A special feature of this compensating mass relates to the fact that, to the extent that it is also placed within the housing of the apparatus, only very little space is present. Space is limited due to the presence of the exciting/receiving unit. Furthermore, it is possibly also necessary that at least parts of the apparatus be potted, so that, also as a result of the potting, available space is lessened. Via a suitable spring element, it is made possible to transmit the energy also in the case wherein the compensating mass cannot have direct contact e.g. with the housing.

An embodiment includes that the exciting/receiving unit includes at least one piezoelectric element. Such piezoelectric elements, or piezotransducers, convert electrical alternating voltages into mechanical oscillations and conversely mechanical oscillations into electrical alternating voltages. By these elements, thus, the transformation of mechanical oscillations into electronically exploitable signals, and vice versa, can be easily implemented.

An embodiment provides that the exciting/receiving unit is essentially embodied in cylindrical shape. In such case, this usually involves a stack of piezoelectric elements. Such stacks are in most cases placed centrally on the inner side of the membrane.

An embodiment provides that the compensating mass includes at least one internal cavity which surrounds the exciting/receiving unit. Consequently, thus, the compensating mass lies around the exciting/receiving unit and fills the space around it. For this embodiment, also the above referenced spring element is very helpful. Additionally, with this embodiment, the lack of space is handled.

An embodiment provides that the mechanically oscillatable unit is an oscillatory fork having two oscillatory rods spaced from one another. In the case of such oscillatory forks, the oscillatory rods can be bent by the medium so that the symmetry, otherwise, present is removed and axially acting, reaction forces can occur in the seating. Consequently, thus especially in the case of such forks, the invention is very important.

An embodiment provides that the process variable is the fill level, density or viscosity of the medium. These process variables were already discussed in the introduction.

BRIEF DESCRIPTION OF THE DRAWINGS

The invention will now be explained in greater detail on the basis of, the figures which show as follows.

DESCRIPTION OF THE PREFERRED EMBODIMENTS

Figure 1:
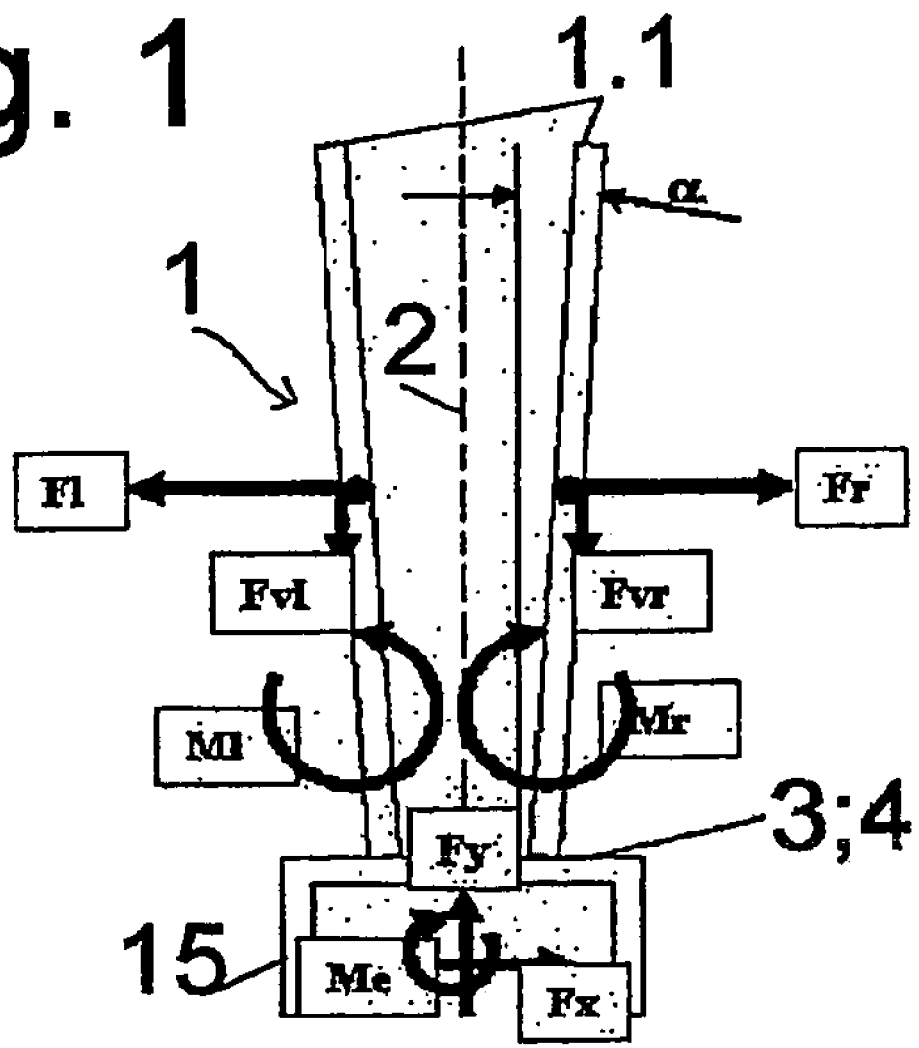
FIG. 1 forces and moments acting on the seating in the case of an oscillatory fork.

FIG. 1 shows the forces exerted by a mechanically oscillatable unit 1 on a seat or seating 3. The mechanically oscillatable unit 1 is, in this case, secured to a membrane 4 and is excited by an exciting/receiving unit 5 (see FIG. 3) to mechanical (transverse or bending) oscillations. The mechanically oscillatable unit 1 is composed of two oscillatory rods 1.1, which are affixed symmetrically to the membrane 4 and are slightly inclined relative to the longitudinal or symmetry axis 2 in opposite directions. The oscillatable unit 1 is thus widened. Both rods 1.1 oscillate with opposite phase relative to one another. The inertial forces Fr, Fl, as well as Fvr and Fvl caused thereby, act oppositely in the radial direction, but with the same sense in the axial direction. If one forms the sum of the forces in the radial direction, one thus calculates the reaction force Fx in the membrane plane. One obtains 0 as the remaining reaction force: −Fl+Fr=Fx=0. In the axial direction, one obtains the sum of both acceleration components which are absorbed by the seating 3 as a reaction force: Fy=Fvr+Fvl. The torques Ml and Mr of the left and right oscillatory rods 1.1 mutually cancel, so that Me=0. The force balance thus shows the reaction force Fx arising in the seating 3 is equal to 0, since the sum of the two forces Fr and Fl equals 0. The axial reaction force Fy in the seating 3, in the form of the sum of the two axial forces Fvr and Fyl, is, however, not equal to 0, because the two forces act in the same direction. The reaction force Fy is dependent on the angular position α of the two oscillatory rods 1.1. For the case in which α=0, i.e. in the case that both oscillatory rods 1.1 are oriented perpendicularly to the membrane 4, the reaction force Fy is likewise 0 since the separate force components are 0. For an ideally decoupled oscillatory system, it holds that, if Fx=Fy=0 and Mx=My=0, so that no oscillatory energy is lost. This analysis assumes, in such case, that the oscillatory amplitudes are sufficiently small.

Since the angular position of the oscillatory rods 1.1 relative to another is of importance for application technical reasons (a widening e.g. makes sense for preventing clamping of material between the oscillatory rods), one must either accept the overcoupling on the screw-in piece 3 or cancel it with the help of an auxiliary measure in the oscillatory system. A pure dissipation would also be possible, but is not implemented here. Pure stiffness changes in the membrane 4 have no influence on the decoupling of such an oscillatory system.

Figure 2:
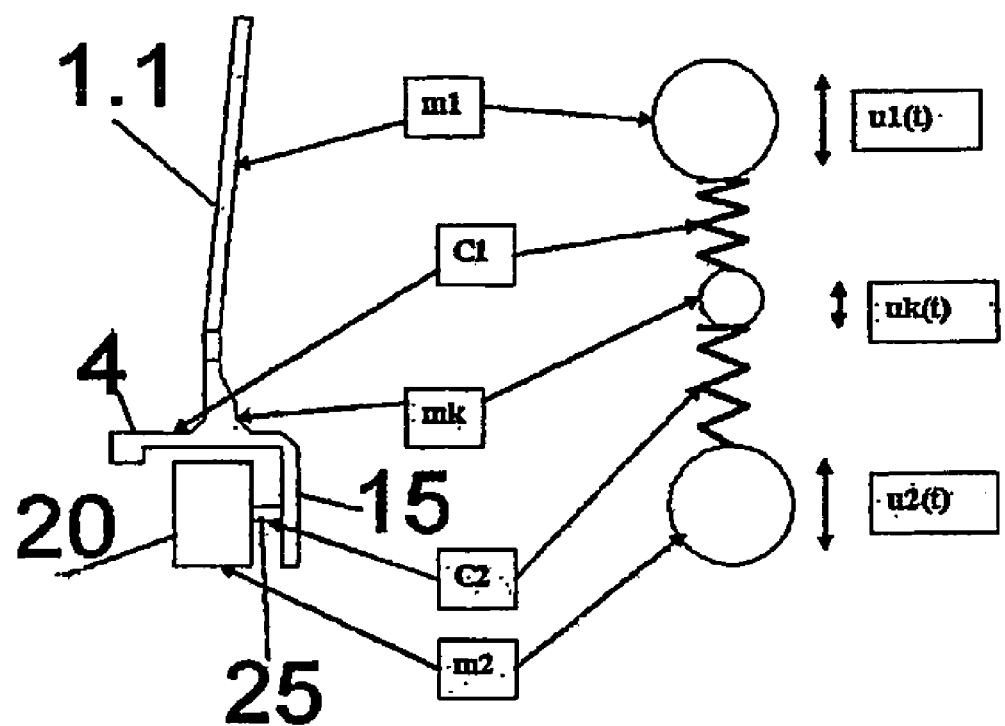
FIG. 2a a schematic drawing of an oscillatory rod with the compensating mass.
FIG. 2b a physical, simulating system for the oscillatory rod and the compensating mass.

FIG. 2a shows half of the measuring apparatus. Displayed is an oscillatory rod 1.1 which is secured to the membrane 4. Membrane 4 is part of the housing 15. Mounted in the housing 15 is the compensating mass 20 by way of the spring element 25. The oscillatory rod 1.1 is slightly inclined, so that this rod 1.1 and the corresponding second rod (not shown here) exert together an axial force on the membrane 4. This reaction force is canceled by the compensating mass 20, which oscillates in opposite phase to the mechanically oscillatable unit 1 in the axial direction, and, in this way, absorbs and cancels the reaction force on the membrane 4.

FIG. 2b shows a model corresponding to the embodiment presented in FIG. 2a. This half oscillatory system is composed of the following masses: m1 (for the oscillatory rod 1.1), m2 (for the compensating mass 20) and mk (for the mass of the membrane 4, respectively the seating 3, and the housing 15) and the springs with the following spring stiffnesses: c1

(for the oscillatory coupling between oscillatory rod 1.1 and the membrane 4) and c2 (for the coupling between housing 15, as elongation of the membrane 4, and the compensating mass effected by the spring element 25).

The purpose of the spring element 25 of stiffness c2 and the compensating mass 20 with the mass m2 additionally accommodated in the housing 15 is, with correct matching with the spring c1 and the mass m1, to bring the movement uk(t) of the mass mk (membrane 4) to zero. On the basis of these considerations, thus, a corresponding tuning is required.

Figure 3:
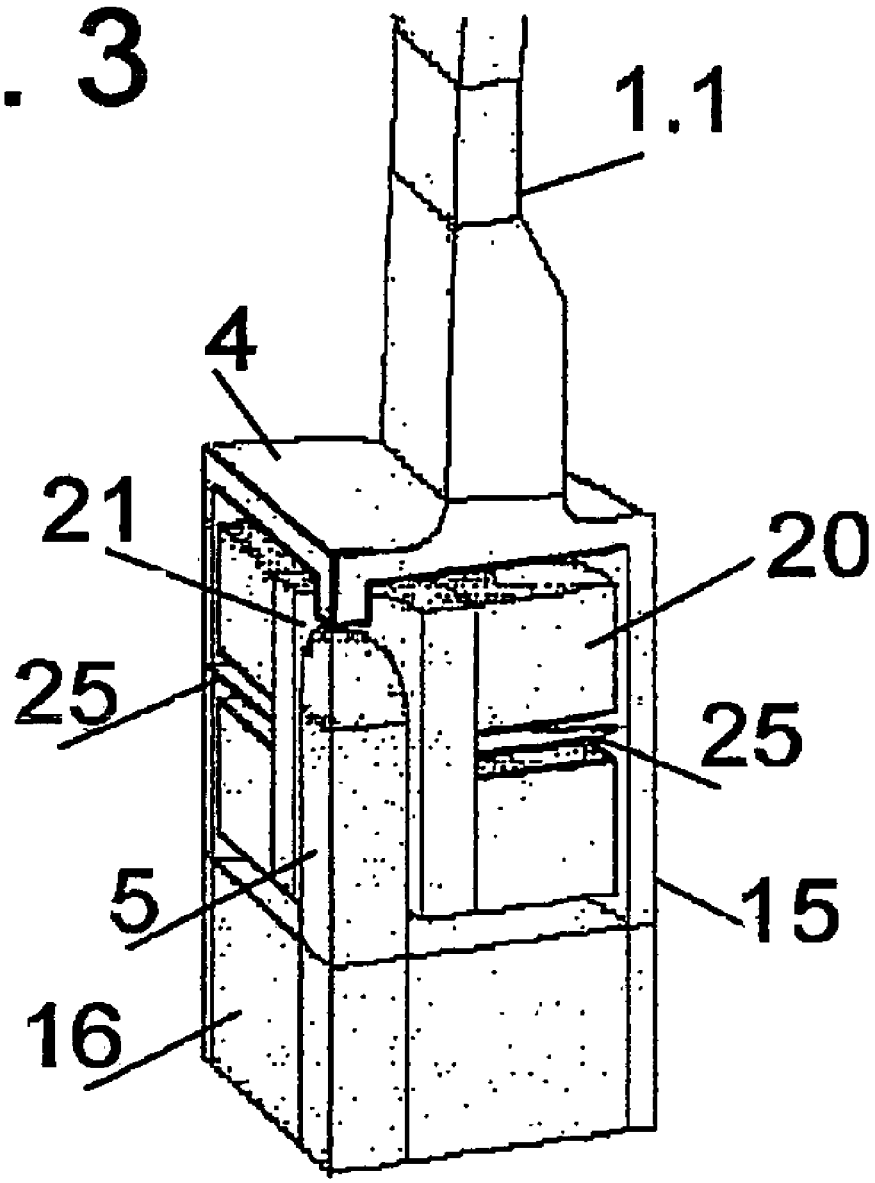
FIG. 3 a partial perspective layout of the compensating mass of the invention.

FIG. 3 shows a concrete embodiment of the arrangement shown in FIG. 2a. Illustrated here is the exciting/receiving unit 5, which in this case is essentially cylindrically shaped. In such case, by way of example, a stack of piezoelectric elements is provided, which are, with an alternating electric voltage, excited to mechanical oscillations. These oscillations are transferred via the membrane 4 to the mechanically oscillatable unit 1 (here illustrated by one of the two oscillatory rods 1.1). In this case, the oscillations are bending oscillations, or transverse oscillations, thus oscillations parallel to the membrane 4, respectively perpendicular to the axis of symmetry 2 of the mechanically oscillatable unit 1, respectively perpendicular to the longitudinal axis of the oscillatory rod 1.1. Conversely, the exciting/receiving unit 5 transforms the mechanical oscillations of the mechanically oscillatable unit 1 into an alternating electric voltage, from which, then, a conclusion can be drawn as regards the process variable (while, in the system illustrated here, the process variable concerns primarily a fill level density or viscosity, other variables are, however, also possible) to be determined or to be monitored. The exciting/receiving unit 5 is mounted on the rigid support 16, which is embodied in such a manner that the energy of the exciting/receiving unit 5 is transferred, as much as possible, completely to the membrane 4. Membrane 4 is connected with the housing 15 of the apparatus. Located in the housing 15 is the compensating mass 20, which is connected via a spring element 25 with the housing 15 and consequently with the membrane 4. In the case of the spring element 25, such is for example, a plurality of leaf springs which are connected securely with the compensating mass 20 and which are, for example, welded with the housing 15. Another option, however, is to use a single large leaf spring. As can be seen, compensating mass 20 includes an internal cavity 21 which surrounds the exciting/receiving unit 5. The compensating mass 20, thus, is in the form of an annular washer, which has on the outside an encompassing cavity, in which the spring element 25 is arranged.

Figure 4:
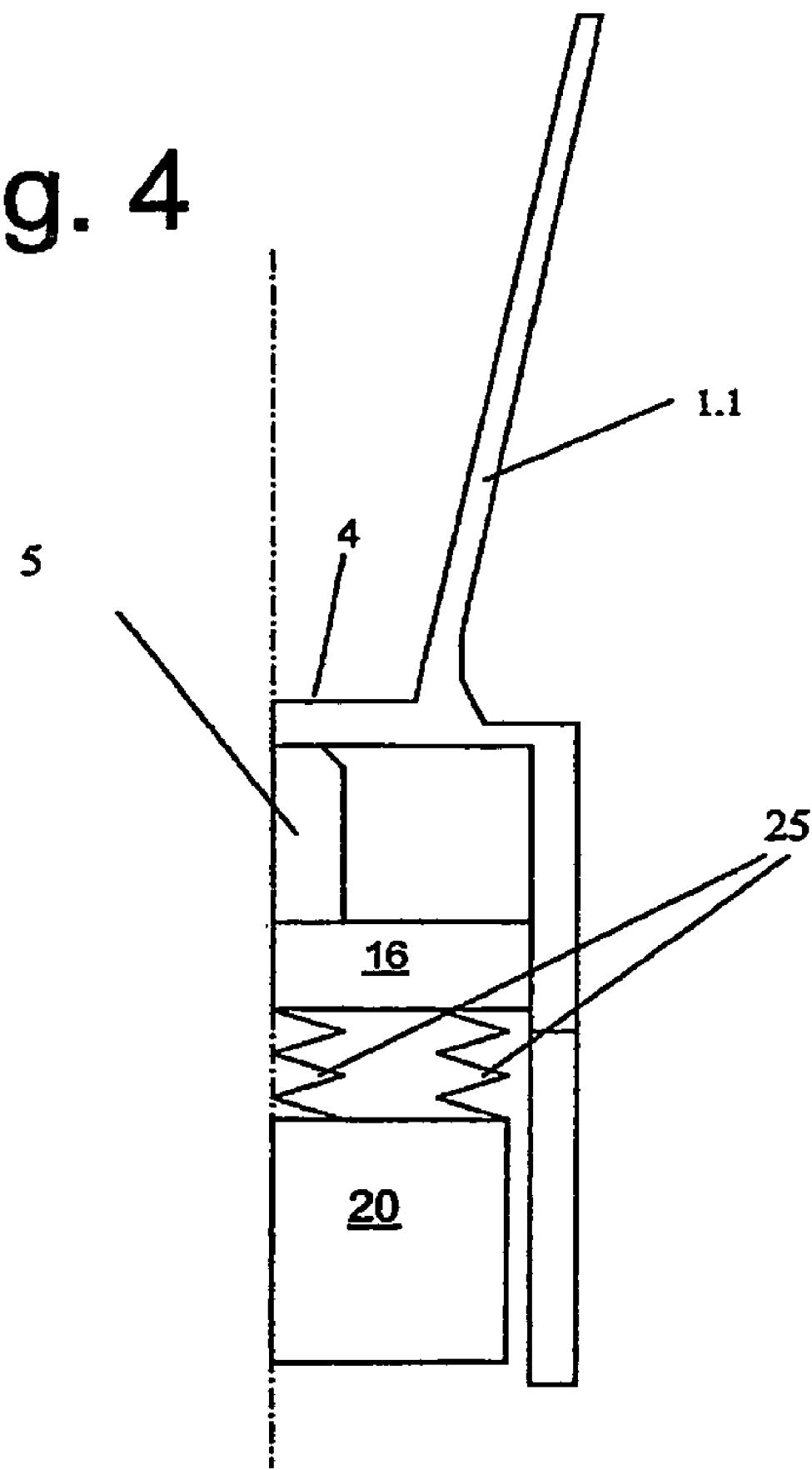
FIG. 4 another embodiment of the compensating mass of the invention.

FIG. 4 shows half of the measuring apparatus, with the axis of symmetry drawn in. Mounted on the membrane 4 is an oscillatory rod 1.1 of the mechanically oscillatable unit 1. The exciting/receiving unit 5, which is in this case a stack of piezoelectric elements, is clamped between the membrane 4 and the support 16. If axial force components of the mechanically oscillatable unit 1 act on the housing 15, then these are transferred, via the housing 15, the support 16, and the spring elements 25, to the compensating mass 20, which cancels these force components by opposing oscillations. In this embodiment, the compensating mass 20 is thus arranged behind the exciting/receiving unit 5. This embodiment shows also very impressively that the compensating mass 20 oscillates in the axial direction, thus in the direction of the axis of symmetry or longitudinal axis and consequently perpendicularly to the axis of oscillation of the mechanically oscillatable unit 1.

Figure 5:
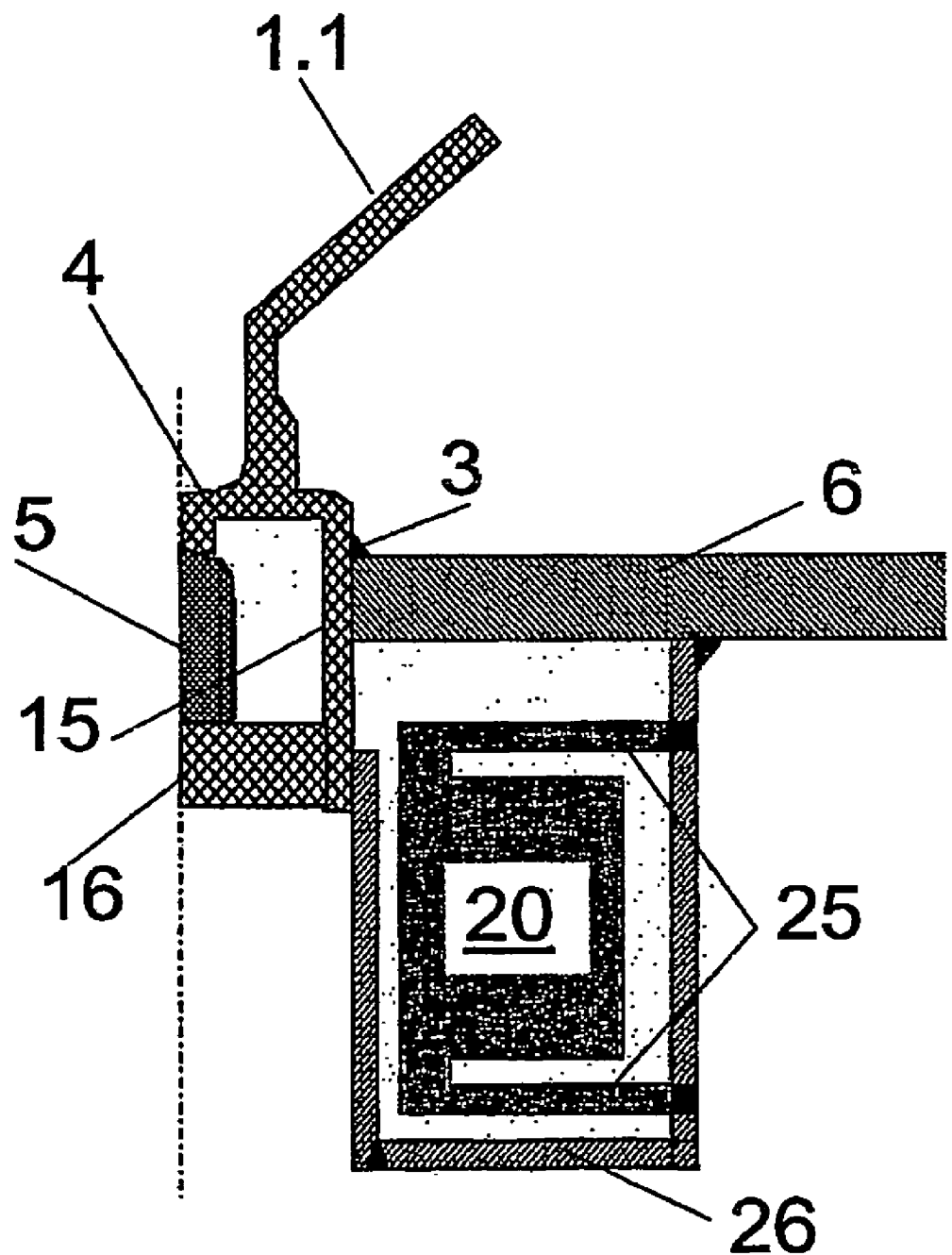
FIG. 5 a further embodiment of the compensating mass of the invention.

FIG. 5 shows one of two oscillatory rods 1.1 mounted on the membrane 4. The oscillatory rod 1.1, which oscillates preferably with the resonance frequency, is, in this instance, inclined at forty-five degrees relative to the normal. The same is true for the second oscillatory rod (not shown) of the oscillatory fork. The drawing in FIG. 5 is, as is the case also for the other figures, not to scale. The seating 3 for the housing 15, on which the membrane 4 is located and which surrounds at least the exciting/receiving unit 5, is located here on a flange 6. The axial forces of the oscillations of the oscillatory rods 1.1 resulting from the forty-five degree inclination are cancelled by the compensating mass 20, which is located in a surrounding housing 26 and which, at least partially, radially surrounds the housing 15 of the vibratory sensor. The surrounding housing 26 in turn is affixed to the housing 15 and to flange 6. This embodiment enables that a vibratory sensor known from the state of the art can be used, and that it can, additionally, be equipped with the compensating mass 20, i.e. it is quasi retrofitted for the case of inclination of the oscillatory rods 1.1. To this end, the surrounding housing 26 can be welded on, or at least connected with the flange 6 and the housing 15 with force interlocking provided by screws. The compensating mass 20 itself is suspended in the surrounding housing 26 via two springs 25, which serve also for force transfer. The compensating mass 20 and the working of the oscillatable unit 1 in resonance lead to the fact that a very small energy supply is sufficient for maintaining the oscillations.

The invention claimed is:

1. An apparatus for determining and/or monitoring at least one process variable of a medium, comprising:
    a mechanically oscillatable unit, which executes mechanical oscillations in at least one direction and which is secured at a seating;
    an exciting/receiving unit, which excites said mechanically oscillatable unit to mechanical oscillations and which receives the mechanical oscillations of said mechanically oscillatable unit; and
    a control/evaluation unit, which controls the mechanical oscillations of said mechanically oscillatable unit and which, with the mechanical oscillations of said mechanically oscillatable unit, determines and/or monitors the process variable; and
    at least one compensating mass which is mechanically coupled with said mechanically oscillatable unit and which is embodied and/or secured in such a manner that it executes mechanical oscillations in at least one direction, wherein:
    the direction of the oscillations of said compensating mass is essentially perpendicular to the direction of the oscillations of said mechanically oscillatable unit.

2. The apparatus as claimed in claim 1, wherein:
    the mechanically oscillatable unit is embodied and/or secured in such a manner that it executes mechanical oscillations essentially perpendicularly to one of its longitudinal axes; and
    said compensating mass is embodied and/or secured in such a manner that it executes at least axial oscillations parallel to the longitudinal axis of said mechanically oscillatable unit.

3. The apparatus as claimed in claim 1, wherein:
    said compensating mass is embodied and/or secured in such a manner that reaction forces from said mechanically oscillatable unit acting on said seating are cancelled.

4. The apparatus as claimed in claim 1, wherein:
    said mechanically oscillatable unit is secured to at least one membrane.

5. The apparatus as claimed in claim 4, wherein:
    said exciting/receiving unit is secured to said membrane.

6. The apparatus as claimed in claim 1, further comprising:
at least one housing wherein:
said mechanically oscillatable unit is connected with said housing; and
said compensating mass is connected with said housing.

7. The apparatus as claimed in claim 1, wherein:
said exciting/receiving unit includes at least one piezoelectric element.

8. The apparatus as claimed in claim 7, wherein:
said compensating mass has at least one internal cavity which surrounds said exciting/receiving unit.

9. The apparatus as claimed in claim 1, wherein:
said mechanically oscillatable unit comprises an oscillatory fork having two oscillatory rods spaced from one another.

10. An apparatus for determining and/or monitoring at least one process variable of a medium, comprising:
a mechanically oscillatable unit, which executes mechanical oscillations in at least one direction and which is secured at a seating;
an exciting/receiving unit, which excites said mechanically oscillatable unit to mechanical oscillations and which receives the mechanical oscillations of said mechanically oscillatable unit; and
a control/evaluation unit, which controls the mechanical oscillations of said mechanically oscillatable unit and which, with the mechanical oscillations of said mechanically oscillatable unit, determines and/or monitors the process variable; and
at least one compensating mass which is mechanically coupled with said mechanically oscillatable unit and which is embodied and/or secured in such a manner that it executes mechanical oscillations in at least one direction, wherein:
the direction of the oscillations of said compensating mass is essentially perpendicular to the direction of the oscillations of said mechanically oscillatable unit, and
said compensating mass is mechanically coupled with said mechanically oscillatable unit via at least one spring element.

11. An apparatus for determining and/or monitoring at least one process variable of a medium, comprising:
a mechanically oscillatable unit, which executes mechanical oscillations in at least one direction and which is secured at a seating;
an exciting/receiving unit, which excites said mechanically oscillatable unit to mechanical oscillations and which receives the mechanical oscillations of said mechanically oscillatable unit; and
a control/evaluation unit, which controls the mechanical oscillations of said mechanically oscillatable unit and which, with the mechanical oscillations of said mechanically oscillatable unit, determines and/or monitors the process variable; and
at least one compensating mass which is mechanically coupled with said mechanically oscillatable unit and which is embodied and/or secured in such a manner that it executes mechanical oscillations in at least one direction, wherein:
the direction of the oscillations of said compensating mass is essentially perpendicular to the direction of the oscillations of said mechanically oscillatable unit, and
said compensating mass has at least one internal cavity which surrounds said exciting/receiving unit.

\* \* \* \* \*